United States Patent [19]

De Leon et al.

[11] 4,433,000
[45] Feb. 21, 1984

[54] METHOD FOR PREVENTING SEPARATION IN FRUIT JUICE-CONTAINING PRODUCTS

[75] Inventors: Joe R. De Leon; Maritza G. Boak, both of Houston, Tex.

[73] Assignee: Coca Cola Company, Atlanta, Ga.

[21] Appl. No.: 412,243

[22] Filed: Aug. 27, 1982

Related U.S. Application Data

[63] Continuation of Ser. No. 208,311, Nov. 19, 1980, abandoned.

[51] Int. Cl.$^3$ ............................................. A23L 2/02
[52] U.S. Cl. ................................. 426/599; 426/330.5
[58] Field of Search ............ 426/599, 590, 573, 330.5, 426/654

[56] References Cited

U.S. PATENT DOCUMENTS 4,163,807  8/1979  Jackman ............................. 426/599

OTHER PUBLICATIONS

Furia, Handbook of Food Additives, Published by the Chemical Rubber Co., Cleveland, Ohio, 1968, (pp. 350 and 366).
"Cellulose Gum", Published by the Hercules Incorporated, 1976, pp. 1–29.
Moncrieff, "Stabilizing Fruit Drinks", Food, Dec., 1953, pp. 498–499.

*Primary Examiner*—Raymond N. Jones
*Assistant Examiner*—George C. Yeung

[57] ABSTRACT

The tendency of solids in fruit juice-containing products, particularly citrus fruit juice-containing products, to separate from the product is reduced and/or prevented by incorporating into the product an effective amount of low viscosity propylene glycol alginate and sodium carboxymethylcellulose.

11 Claims, No Drawings

METHOD FOR PREVENTING SEPARATION IN FRUIT JUICE-CONTAINING PRODUCTS

This is a continuation of application Ser. No. 208,311 filed Nov. 19, 1980, now abandoned.

BACKGROUND OF THE INVENTION

The present invention relates to fruit juice-containing products and, in particular, to a method for eliminating or minimizing the separation of solids in such products.

Fruit juice-containing products, i.e., aqueous-based beverages or preparations containing fruit juice (as well as concentrates from which such beverages or products may be prepared), are well-known in the art and have achieved a relatively high degree of commercial acceptance. A known difficulty with such products, however, is the separation of the fruit juice solids (e.g., pulp) in the product, that is, the difficulty in maintaining the fruit juice solids in suspension or dispersion in the beverage or preparation over a prolonged period of time. As a result, at the time of purchase and consumption of the product, the fruit juice solids often will have either settled toward the bottom of the container or floated toward the surface, depending upon the relative densities of the solids and the liquid product. In either event, the product thus is non-uniform in composition throughout the container.

Although agitation of the fruit juice-containing product in its container prior to use generally will provide the requisite uniform drink or preparation, many consumers either forget to take this measure or find it cumbersome or difficult to do so, particularly where the product, e.g., beverage, is packaged for purchase in a large volume container such that product will be poured therefrom on a periodic basis, i.e., after being re-stored for a time sufficient to result in re-separation of solids. In addition, for certain fruit juice-containing products, once the fruit juice solids have separated it is difficult to reinstate the desired suspension, even with agitation, owing either to the nature of the solids per se or some interaction (e.g., agglomeration) between separated particles which alters their solubility or dispersibility in the product.

Fruit juice-containing products packaged in transparent, e.g., glass or plastic, containers present an added difficulty with respect to the aesthetically undesirable visible presence of solids at the bottom or top thereof at the time of purchase by the consumer.

Prior art attempts at overcoming these difficulties typically make use of natural or synthetic additive materials as stabilizers in an effort to maintain the juice solids in suspension. Most such additive systems proposed simply are ineffective for this purpose, particularly in highly acidic products having a pH of about 3.0 or less. Moreover, the additives proposed often rely per se on their ability to increase the viscosity of the product in order to more effectively maintain the solids in suspension, or contribute this property incident to their stabilizing function. As a result, the final product is undesirably thickened and often exhibits an undesirable mouthfeel. Still further, known additives typically generate difficulties in the juice product manufacturing process. For example, many such additives require elaborate and expensive mixing procedures to effect their dissolution in the product. In certain cases, stabilizer additives require some form of heat processing to bring about their activation for this purpose. However, such heat processing may be inconsistent or incompatible with the processing necessary or desired for preparing the juice-containing product per se.

SUMMARY OF THE INVENTION

It is an object of the present invention to provide a means for reducing separation of juice solids in fruit juice-containing products.

Another object of the present invention is to provide fruit juice-containing products, for example single-strength products and concentrates, exhibiting reduced separation of juice solids.

Yet another object of the present invention is to provide both aqueous-based and substantially water-free concentrates which, upon reconstitution with water, result in fruit juice-containing products having reduced separation of solids.

These and other objects are attained by the inclusion in the fruit juice-containing product or concentrate of a stabilizer system comprised of a mixture of low viscosity propylene glycol alginate and sodium carboxymethylcellulose.

According to the present invention, the ultimate desire is the provision of a fruit juice-containing product exhibiting reduced solids separation, i.e., wherein the fruit juice solids are more effectively maintained in relatively uniform suspension throughout the product over an extended period of time. Such products may include single-strength fruit juice beverages or other products which are packaged for immediate consumption or use by the consumer; concentrated products which are not per se subject to solids separation difficulties but which are ultimately utilized to prepare reconstituted products which otherwise would be subject to separation; and concentrated products which would exhibit undesirable solids separation both in their concentrated state and in their reconstituted form.

The stabilizer system of the present invention comprises propylene glycol alginate, the water-soluble propylene glycol ester of alginic acid, and sodium carboxymethylcellulose, a synthetic water-soluble ether of cellulose. These gums or hydrophilic colloids are either pre-blended for addition to the fruit juice-containing product or added to the product separately, e.g., either simultaneously or sequentially, such that the product contains an effective amount of each, typically from about 0.015% to about 0.20% propylene glycol alginate and 0.01% to about 0.10% sodium carboxymethylcellulose, percents by weight based upon the total weight of single-strength product, to result in reduced solids separation. At the levels of gum so utilized, it is found that the product can be stabilized over a wide range of conditions, e.g., temperature and pH, without substantially affecting the viscosity or mouthfeel of the product.

The method of incorporating the gums into the fruit juice-containing product is not critical per se so long as effective dissolution of the gums is achieved. Thus, for example, where the fruit juice-containing product is an aqueous single-strength product or aqueous concentrate, the gums, in a substantially dry state, may be added to the liquid mixture of all other ingredients to achieve hydration, dispersion and dissolution of the gums therein. Alternatively, the dry gums may be added to only a portion of the liquid mixture of other ingredients to effect hydration, dispersion and dissolution of the gums, with the remaining ingredients, e.g., additional water, being thereafter added.

In another method, the gums may be hydrated, dispersed and dissolved in an appropriate amount of liquid medium in a separate vessel and the thus prepared solution thereafter added to a vessel containing the main body of ingredients. Alternatively, the gums may be dry blended with one or more dry ingredients of the fruit juice-containing product and the thus prepared blend thereafter added to the liquid mixture of the remaining ingredients. A dry-blending procedure obviously is desirable where the fruit juice-containing product is a substantially dry mixture intended to be reconstituted with water for ultimate use.

As earlier noted, the fruit juice-containing products to which the present invention is directed may assume a variety of forms. According to one embodiment of the invention, the product may be one which is manufactured and sold at a dilution or concentration suitable for immediate consumption or use, in which case the product will comprise fruit juice solids, water and the stabilizer system, typically in conjunction with sweeteners, acidulants, colorants, preservatives, flavorings, and the like. The fruit juice-containing product also may be one which is manufactured and sold in an aqueous-based concentrated form wherein the consumer is required to add additional water for ultimate use. Again, the product is comprised basically of water (in an amount less than that appropriate for ultimate use), fruit juice solids and the stabilizer system, with sweeteners, acidulants, colorants, etc. added as necessary. Such a concentrate may be one which is otherwise subject to separation difficulties only when reconstituted to proper dilution or which exhibits such problems both in the concentrated and reconstituted state. Still further, the fruit juice-containing product may be a substantially water-free, reconstitutable product comprised of fruit juice solids, stabilizer and other optional ingredients such as those earlier noted. Such a product, of course, will otherwise exhibit undesirable separation of solids only after reconstitution.

The juice-containing product also may be a manufactured concentrate which is intended to be further processed by the same or a different manufacturer, typically at some different location, to a properly diluted product which is then sold to the ultimate consumer. In such a case, the stabilizer system may be present in the concentrate, comprised of water, juice solids and other optional ingredients, as it leaves the first manufacturer, particularly if separation of solids might occur in the concentrate per se; alternatively, it may prove more economical to manufacture the concentrate free of stabilizer whereby the stabilizer is added to the product incident to the dilution and other steps performed by the final processor.

In each of the products described, the water and juice solids present in the product typically are derived from water-containing fruit juice, either in natural or concentrated form, and, particularly for products manufactured for immediate use, additional water. For certain products, however, the sole source of water in the fruit juice-containing product may possibly be derived from the water present in the fruit juice or alternatively, the sole source of water may comprise added water.

As will be apparent from the more detailed description and Examples given in the following section, the stabilizer system employed in the present invention is uniquely and surprisingly superior to known stabilizers in its ability to reduce sedimentation in fruit juice-containing products. Indeed, use of either of the individual components of the stabilizer system alone is ineffective in accomplishing the desired results.

DETAILED DESCRIPTION OF THE INVENTION

Further details regarding the present invention are provided with reference to the following illustrative, nonlimiting Examples:

EXAMPLE I

An orange juice beverage is prepared from the following ingredients:

| | | |
|---|---|---|
| Orange Juice Concentrate (65° Brix) | | 14.50 gal. |
| Orange Oil | | 0.20 gal. |
| Citric Acid | | 20.00 lbs. |
| Sodium Citrate | | 10.00 lbs. |
| FD&C Yellow #6 | | 0.25 lbs. |
| Sugar | | 915.00 lbs. |
| Water | Approx. | 914.11 gal. |
| | TOTAL: | 1000.00 gal. |

To an agitated vessel containing this product are added from about 1.31 to about 17.45 pounds of propylene glycol alginate (Kelco Kelcoloid-0) and from about 0.87 to 8.72 pounds of sodium carboxymethylcellulose (Hercules CMC-7LF). The product is then adjusted to 12.0° Brix and 0.30% acid, heated to a temperature of about 195° to 205° F. to effect sterilization and filled into transparent glass bottles. The bottled product in then cooled to room temperature.

EXAMPLE II

An orange juice syrup concentrate intended to be diluted with 5 parts water for each part of concentrate to form a suitable beverage is prepared from the following ingredients:

| | | |
|---|---|---|
| Orange Juice Concentrate (65° Brix) | | 87.0 gal. |
| Orange Oil | | 1.2 gal. |
| Citric Acid | | 120.00 lbs. |
| Sodium Hexametaphosphate | | 52.0 lbs. |
| Sodium Benzoate | | 52.0 lbs. |
| FD&C Yellow #6 | | 1.5 lbs. |
| Sugar | | 5435.0 lbs. |
| Water | Approx. | 488.7 gal. |
| | TOTAL: | 1000.0 gal. |

To an agitated vessel containing this product are added from about 7.85 to about 104.69 pounds of propylene glycol alginate (Kelco Kelcoloid-0) and from about 5.23 to about 52.34 pounds sodium carboxymethylcellulose (Hercules CMC-7LF). The product is adjusted to 72° Brix and 1.80% acid (resulting in a product which, upon dilution at 5:1, has 0.30% acid and a soluble solids content of 12.0° Brix) and filled into suitable containers at room temperature.

Sequestrants such as sodium hexametaphosphate employed above or calcium disodium ethylenediaminetetraacetate dihydrate are found to enhance product stability, particularly in concentrates.

EXAMPLE III

A grapefruit drink is prepared by first preparing a beverage base from the following ingredients:

| | |
|---|---|
| Grapefruit Concentrate (65° Brix) | 760.0 gal. |
| Grapefruit Oil | 12.5 gal. |

-continued

| | | |
|---|---|---|
| Sodium Citrate | | 625.0 lbs. |
| Sodium Hexametaphosphate | | 545.0 lbs. |
| FD&C Yellow #5 | | 3.0 lbs. |
| Citric Acid | | 155.0 lbs. |
| Water | Approx. | 148.5 gal. |
| | TOTAL: | 1000.0 gal. |

This base is adjusted to 48.3° Brix and 5.4% acid and stored in a frozen condition. The base is thereafter thawed and 16.0 gallons thereof mixed with 800 pounds of sugar and 920 gallons of water to produce a grapefruit drink. To this drink are added from about 1.30 to 17.38 pounds of propylene glycol alginate (Kelco Kelcoloid-0) and about 0.87 to 8.69 pounds sodium carboxymethylcellulose (Hercules CMC-7LF). The resultant product is adjusted to 11.0° Brix and 0.60% acid and packed into containers at a temperature of from 195° F. to 205° F. after which the containers are cooled to room temperature.

EXAMPLE IV

A control fruit punch beverage was prepared from the following ingredients:

| | |
|---|---|
| Sucrose | 693.97 grams |
| High Fructose Corn Syrup (68.5° Brix) | 385.01 grams |
| Citric Acid | 12.86 grams |
| Fruit Punch Concentrate | 219.74 grams |
| Water | 7430.42 grams |
| TOTAL: | 8742.00 grams |
| | (8.32 liters) |

The beverage has a fruit juice content of 10% (orange and pineapple), a pH of about 3.0 (±0.2), 0.30% acid and 12.5° Brix and was heated to about 195°–205° F. to effect sterilization and packed into four 64 ounce glass bottles. The bottled product was then brought to ambient conditions and stored.

A sample fruit punch beverage for comparison to the control was prepared from the following ingredients:

| | | |
|---|---|---|
| Sucrose | 689.99* | grams |
| High Fructose Corn Syrup (68.5° Brix) | 385.00 | grams |
| Citric Acid | 12.86 | grams |
| Water | 7429.83 | grams |
| Kelcoloid-0 (Dry Blended with Sucrose) | 3.26 | grams |
| CMC—7LF | 1.31 | grams |
| Fruit Punch Concentrate | 219.74 | grams |
| TOTAL: | 8742.00 | |
| | (8.32 liters) | |

This product had a pH of about 3.0 (±0.2), 0.30% acid and 12.5° Brix and was packaged in a manner identical to that employed for the control beverage.

Initial sampling of control and sample indicated that neither possessed a gummy or slimy mouthfeel. After 18 hours storage at ambient conditions, the control exhibited a light to medium degree of precipitation of solids and a moderate to heavy degree of precipitation after four days. The sample beverage, however, exhibited no sedimentation of solids even after five days of ambient storage.

EXAMPLE V

Three sample powdered lemonade beverage mixes were prepared by first dry blending a mixture of dried lemon juice powder, sucrose, tricalcium phosphate and powdered lemon flavor to form a base mixture. This base then was used to prepare the three samples by mixing additional dry ingredients therewith according to the following table:

| INGREDIENT | SAMPLE 1 | SAMPLE 2 | SAMPLE 3 |
|---|---|---|---|
| Base | 957.00 gms | 957.00 gms | 957.00 gms |
| Sucrose* (dry) | 3.98 gms | 1.22 gms | — |
| Kelcoloid-0 | — | — | 3.26 gms |
| CMC—7LF | — | 3.15 gms | 1.31 gms |
| | 960.98 gms | 961.37 gms | 961.57 gms |

*The sucrose content of the samples was adjusted to take into account the solids contributed by the gum blend.

The three sample mixes were reconstituted in separate beakers to identical degrees (11.0° Brix) to provide single-strength beverages having a pH of 3.1 and 0.45–0.51% acid. None of the so-prepared beverages exhibited a gummy or slimy mouthfeel or off-flavors. Within one hour of preparation and storage at ambient conditions, Sample 1 exhibited separation of solids as did Sample 2 to a slightly lesser degree. Sample 3 showed no such separation. After an additional 96 hours refrigerated storage, Sample 1 displayed a heavy precipitation of solids at the bottom of the beaker while Samples 2 and 3 exhibited only a slight precipitation.

EXAMPLE VI

A lemon-based single-strength beverage was prepared from the following ingredients:

| | |
|---|---|
| Lemon Concentrate (30.8% lemon acid) | 154.45 gms |
| Lemon Oils | 1.06 gms |
| Ascorbic Acid | 3.84 gms |
| Sodium Citrate | 1.30 gms |
| High Fructose Corn Syrup (70.6° Brix) | 517.05 gms |
| Kelcoloid-0 | 3.26 gms |
| CMC—7LF | 1.31 gms |
| Sucrose | 547.57 gms |
| Water | 7477.16 gms |
| TOTAL: | 8707.00 gms |
| | (approx. 8.32 liters) |

The beverage had a pH of 2.70, 0.57% acid and 11.5° Brix and was hot-packed into four 64 oz. glass bottles. After overnight storage at ambient conditions, the beverage displayed acceptable flavor, mouthfeel and stability.

Utilizing the identical ingredients, amounts, procedure and testing shown above, two additional beverages were prepared wherein the CMC-7LF, a low viscosity sodium carboxymethylcellulose, was replaced with CMC-7MF (medium viscosity) and CMC-7HF (high viscosity) respectively. The beverages prepared from these formulations exhibited substantially the identical properties noted for the sample prepared with CMC-7LF, with the exception that the CMC-7HF containing beverage possessed a very slightly thicker mouthfeel than the other beverages.

In the foregoing examples, the manufacturing procedure employed, as earlier noted, is not critical provided the ingredients of the product are suitably mixed and dispersed and the gum system is added in a manner to achieve suitable hydration, dispersion and dissolution in the product. A number of procedures for insuring adequate dispersion of gums in aqueous systems are known and may be employed in the present invention. Preferred among these methods is the use of an eductor (e.g., Hercules Model 141 Mixing Device) wherein gums are wetted by a high velocity stream of water in the throat portion of the eductor and discharged directly into a receiving vessel containing the remaining liquid mixture of ingredients.

A considerable benefit of the present invention is the ability to stabilize juice-containing products with a gum system without appreciably adversely affecting (i.e., increasing) the viscosity of the product as perceived by the ultimate user. In one experiment, the viscosity of identically prepared lemonade beverages (containing 10% lemon juice, corn and sugar sweeteners) with and without the gum stabilizer system (0.0375% Kelcoloid-0; 0.015% CMC-7LF; percents by weight of total weight single-strength beverage) was measured at 20° C. and 25° C. using a Brookfield Viscometer (Model LVF with U.L. adapter) at two different spindle speeds. At 30 R.P.M. spindle speed, the sample without gums had a viscosity of 1.60 cp at 20° C. and 1.43 cp at 25° C. as compared to 1.71 cp and 1.54, respectively, for the gum-containing sample. At a spindle speed of 60 R.P.M., the measurements at 20° C. and 25° C. for the gum-free sample were 1.54 cp and 1.36 cp as compared to 1.73 cp and 1.51 cp for the gum-containing sample. Such measured differences are imperceptible using sensory means.

The propylene glycol alginate utilized in the present invention is a low viscosity variety thereof. Such products are commercially available and generally are characterized by viscosity values of between about 50 and 175 centipoise for 2% w/w aqueous solutions thereof measured at 25° C. with a Brookfield LVF Viscometer (No. 2 spindle, 60 R.P.M.). The sodium carboxymethylcellulose employed may, as shown in the Examples, vary more widely in its viscosity. However, low viscosity types are preferred, for example, those characterized by viscosity values of between about 25 to 50 centipoise for 2% solids w/w aqueous solutions thereof measured at 25° C. with a Brookfield LVF Viscometer (No. 1 spindle, 60 R.P.M.). The CMC-7HF (high viscosity) sodium carboxymethylcellulose is characterized by viscosity values of between 1500 to 2500 centipoise for 1% solids w/w aqueous solutions measured at 25° C. in accordance with the trade publication CELLULOSE GUM published by the manufacturer of the products CMC-7LF, CMC-7MF and CMC-7HF, Hercules Incorporated (Table II).

The quantities of each such gum are chosen so as to achieve effective stabilization of the particular juice-containing product (i.e., prevention or reduction of solids separation) while minimizing undesired changes in organoleptic properties such as flavor and mouthfeel. As such, the quantities chosen will depend, for example, upon the type gum employed (e.g., low or high viscosity), the relative ratios of the gums, and the type product being treated. Utilization of too little of the gum system will result in ineffective stabilization whereas an excess amount of the gum system may undesirably thicken the product or, indeed, result in the counterproductive separation of gum solids in the product. Typically, additive levels will fall within the range of from about 0.015 to about 0.20% for the propylene glycol alginate and from about 0.01 to about 0.10% for the sodium carboxymethylcellulose, percents by weight of the total weight of single-strength product. Hence, additive levels to dry mixes or aqueous-based concentrates will be chosen so as to result in the presence of the gums within the mentioned levels when the mix or concentrate is reconstituted to a single-strength product.

Fruits which may be used as the basis for the fruit juice-containing products to which the present invention is applicable include lemon, grapefruit, lime, orange, tomato, pineapple and the like as well, of course, as mixtures of juices from one or more such products. Additionally, the gum system of the present invention may be employed to reduce or prevent solids separation in products wherein fruit juices are combined with vegetable-derived juices and in products solely containing such vegetable juices.

In a number of controlled experiments, the efficacy of a number of known hydrophilic colloids to effectively reduce or prevent separation of solids in fruit juice-containing products was tested. Among the gums tested were locust bean gum, furcelleran, pectin, gum acacia, gum tragacanth, guar gum, xanthan gum, sodium carboxymethylcellulose, propylene glycol alginate, differing varieties of these gums and mixtures thereof. In all cases, no single gum or combinations displayed the effectiveness found for the propylene glycol alginate and sodium carboxymethylcellulose combination with respect to reducing or preventing solids separation. Additionally, the gum combination of the present invention possesses the advantages of ease of incorporation into the manufacturing process, comptability with conventional ingredients of juice-containing products, lack of significant effect on the viscosity of the product and absence of disadvantageous organoleptic effects, e.g., gritty or slimy mouthfeel, off-flavors, and the like.

What is claimed is:

1. A method for reducing separation of solids in a fruit juice-containing product comprising incorporating in said product from about 0.015 to about 0.20% of low viscosity propylene glycol alginate and from about 0.01 to about 0.10% of sodium carboxymethylcellulose, the percents being by weight of total single-strength product; the viscosity of the low viscosity propylene glycol alginate being from about 50 to 175 centipoise for a 2% w/w aqueous solution thereof and the viscosity of the sodium carboxymethylcellulose being from about 25 centipoise for 2% solids w/w aqueous solutions thereof to about 2500 centipoise for 1% solids w/w aqueous solutions thereof.

2. The method according to claim 1 wherein said fruit juice-containing product is a single-strength beverage.

3. The method according to claim 1 wherein said fruit juice-containing product is an aqueous-based concentrate capable of being reconstituted with water to form a single-strength product.

4. The method according to claim 1 wherein said fruit juice-containing product is a substantially water-free powdered admixture capable of being reconstituted with water to form a single-strength product.

5. A fruit juice-containing product comprising water, fruit juice solids and, from about 0.015% to about 0.20%, of low viscosity propylene glycol alginate and from about 0.01 to about 0.10% of sodium carboxymethylcellulose, said alginate and carboxymethylcellulose being effective to reduce the separation of solids in said product, the percents being by weight of total single-strength product; the viscosity of the low viscosity propylene glycol alginate being from about 50–175 centipoise for a 2% w/w aqueous solution thereof and the viscosity of the sodium carboxymethylcellulose being from about 25 centipoise for 2% solids w/w aqeuous solutions thereof to about 2500 centipoise for 1% solids w/w aqeuous solutions thereof.

6. The product of claim 5 further comprising one or more sweeteners, acidulants, colorants and flavorings.

7. The product of claim 5 wherein said fruit juice-containing product contains at least one juice from a fruit selected from the group consisting of orange, lemon, pineapple, tomato, lime and grapefruit.

8. A substantially dry fruit juice solid-containing product capable of being reconstituted to a single-strength product, comprising fruit juice solids and, from about 0.015% to about 0.20%, of low viscosity propylene glycol alginate and from about 0.01 to about 0.10% of sodium carboxymethylcellulose, said alginate and carboxymethylcellulose being effective to reduce the separation of solids in said reconstituted product, the percents being by weight of total single-strength product; the viscosity of the low viscosity propylene glycol alginate being from about 50–175 centipoise for a 2% w/w aqueous solution thereof and the viscosity of the sodium carboxymethylcellulose being from about 25 centipoise for 2% solids w/w aqueous solutions thereof to about 2500 centipoise for 1% solids w/w aqueous solutions thereof.

9. An aqueous-based fruit juice-containing concentrated product capable of being reconstituted to form a single-strength product comprising a predetermined amount of water, fruit juice solids and, form about 0.015% to about 0.20%, of low viscosity propylene glycol alginate and from about 0.01 to about 0.10% of sodium carboxymethycellulose, said alginate and carboxymethylcellulose being effective to reduce the separation of solids in said reconstituted product, the percents being by weight of total single-strength product; the viscosity of the low viscosity propylene glycol alginate being from about 50–175 centipoise for a 2% w/w aqueous solution thereof and the viscosity of the sodium carboxymethylcellulose being from about 25 centipoise for 2% solids w/w aqueous solutions thereof to about 2500 centipoise for 1% solids w/w aqueous solutions thereof.

10. A method for reducing the separation of solids in a vegetable juice-containing product comprising incorporating in said product from about 0.015% to about 0.20% of low viscosity propylene glycol alginate and from about 0.01% to about 0.10% of sodium carboxymethylcellulose in percents by weight of total single-strength product; the viscosity of the low viscosity propylene glycol alginate being from about 50–175 centipoise for a 2% w/w aqueous solution thereof and the viscosity of the sodium carboxymethylcellulose being from about 25 centipoise for 2% solids w/w aqueous solutions thereof to about 2500 centipoise for 1% solids w/w aqueous solutions thereof.

11. A method for reducing the separation of solids in a fruit juice-containing product comprising incorporating in said product from about 0.015 to about 0.20% low viscosity propylene glycol alginate and from about 0.01 to about 0.10% sodium carboxymethylcellulose, percents by weight of total single-strength product, said propylene glycol alginate possessing a viscosity value, measured with a Brookfield viscometer at 25° C., of from about 50 to 175 cps for 2% w/w aqueous solutions thereof and said sodium carboxymethylcellulose possessing a viscosity value, measured with a Brookfield viscometer at 25° C., of from about 25 to 50 cps for 2% solids w/w aqueous solutions thereof.

* * * * *